United States Patent [19]
Lutz

[11] 3,855,766
[45] Dec. 24, 1974

[54] CONVERTIBLE BROOM RAKE

[76] Inventor: Verna Lutz, 424 Center St., Ashtabula, Ohio 44004

[22] Filed: July 23, 1973

[21] Appl. No.: 381,506

[52] U.S. Cl. ............................................ 56/400.18
[51] Int. Cl. .............................................. A01d 7/00
[58] Field of Search ........ 56/400.17, 400.18, 400.19

[56] References Cited
UNITED STATES PATENTS

| 2,790,296 | 4/1957 | Bernstein | 56/400.04 |
| 2,902,815 | 9/1959 | Gallo, Sr. | 56/400.19 |
| 3,073,103 | 1/1963 | Kikuchi | 56/400.18 |

FOREIGN PATENTS OR APPLICATIONS

| 58,935 | 7/1941 | Denmark | 56/400.19 |

*Primary Examiner*—Russell R. Kinsey
*Attorney, Agent, or Firm*—Bosworth, Sessions & McCoy

[57] ABSTRACT

A broom rake convertible from a relatively wide lawn-type rake to a relatively narrow shrub-type rake. The rake has a center section and two foldable end sections hinged to opposite sides and selectively movable between an open position extending outwardly from the center section to provide a relatively wide raking span, and a closed position folded rearwardly over the center section to provide a relatively narrow raking span. In the folded condition, the raking span is limited to the width of the center section for convenient use in confined spaces such as around bushes and shrubs.

6 Claims, 13 Drawing Figures

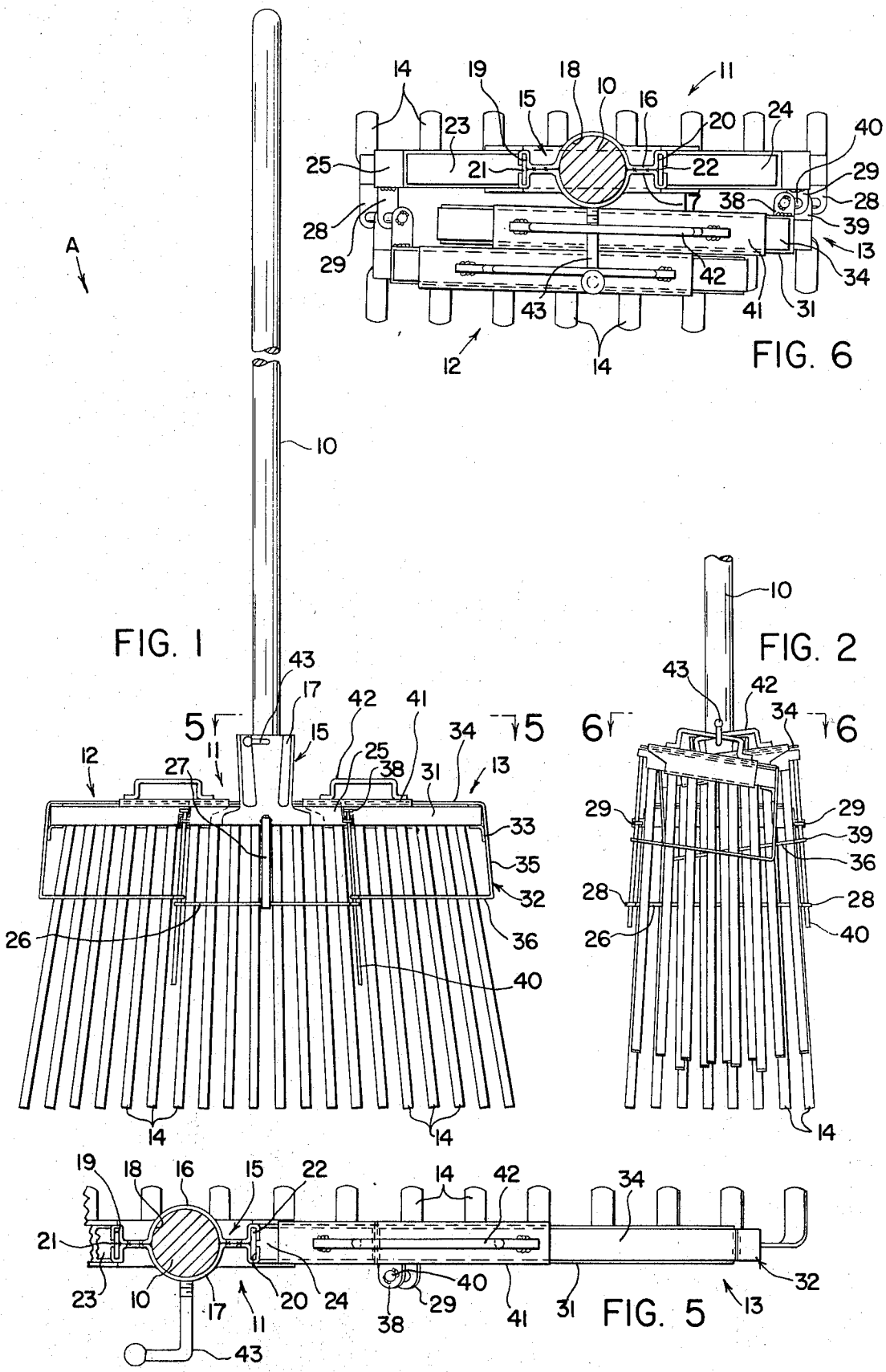

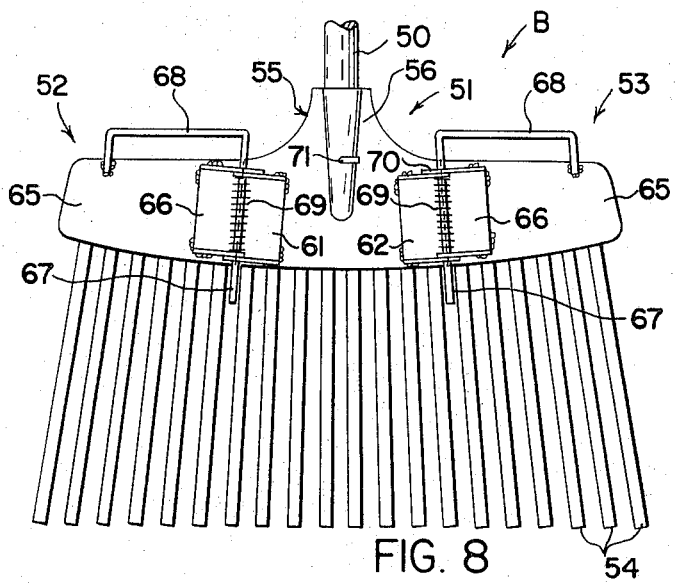
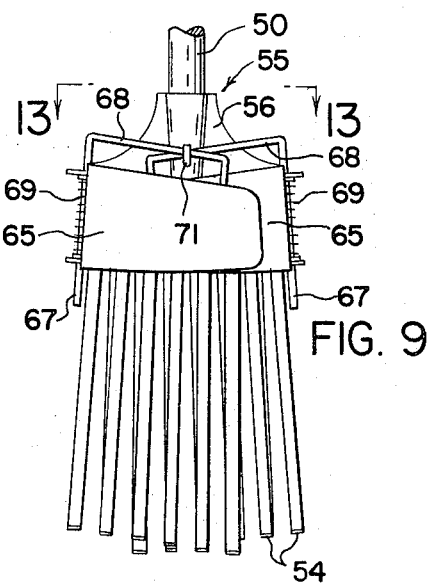
FIG. 8   FIG. 9
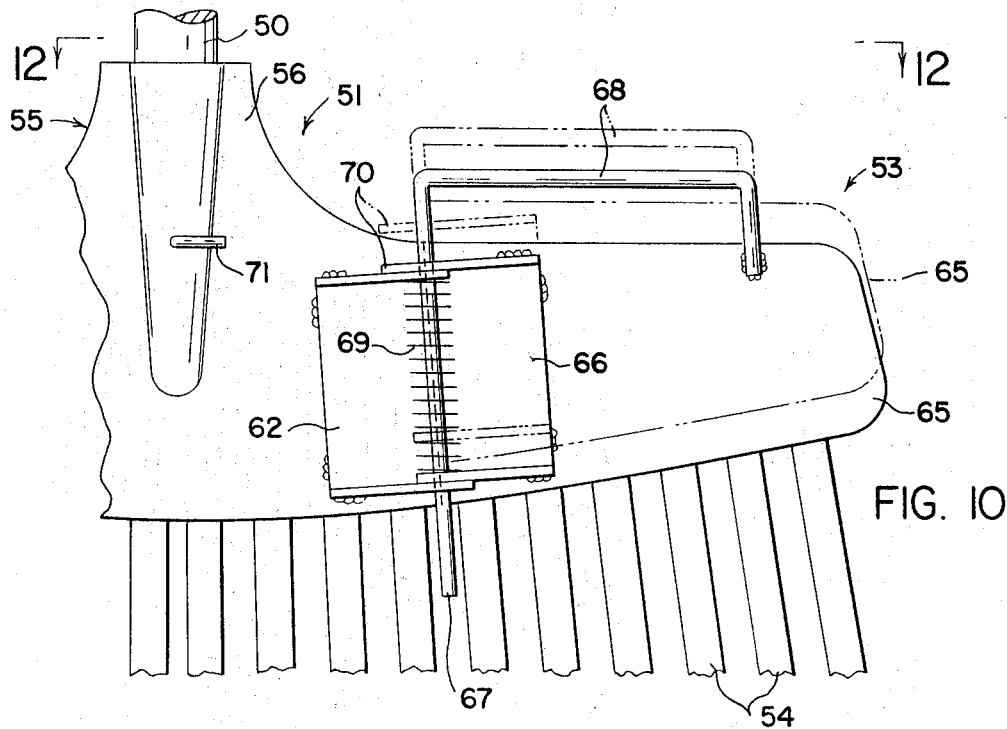
FIG. 10
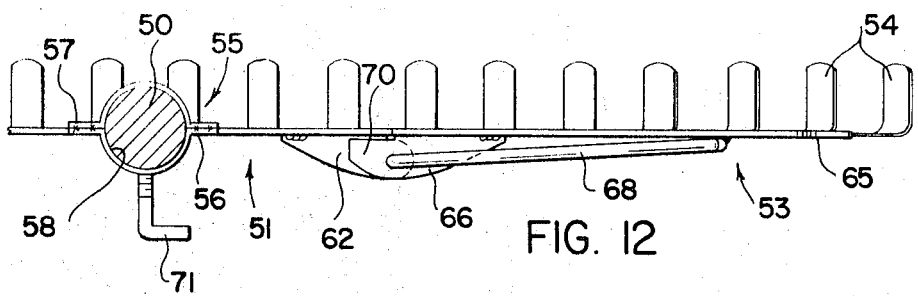
FIG. 12

3,855,766

CONVERTIBLE BROOM RAKE

BACKGROUND OF THE INVENTION

This invention relates to lawn and garden hand tools and especially to broom rakes of the type with a plurality of transversely spaced flexible pronges for sweeping leaves and other debris from lawns and from around bushes and shrubs. More particularly, the invention relates to a multi-purpose broom rake of the type described that converts from a relatively wide rake with a span of 18 inches or more for raking lawns, to a rake of relatively narrow width for raking in confined spaces such as around bushes and shrubs.

Most broom rakes of the type with relatively long flexible pronges formed of bamboo or tempered steel are currently produced in relatively wide span models of widths ranging, for example, between 16 and 24 inches for raking lawns. Other models are produced in much narrower widths for use in sweeping leaves and other debris from around bushes, hedges, shrubs and the like where a wider lawn rake would not be suitable because of the confined spaces. Usually these narrower models range in width from 8 to 12 inches.

In many circumstances, the proper removal of leaves and debris from a yard, including lawn and shrubs etc., would require both types of broom rakes and the user would have to switch from one to the other several times during the raking process. Purchasing, maintaining and storing both types of broom rakes is burdensome, particularly where storage space is limited.

The broom rake of the present invention, however, serves both types of uses described above and eliminates the need for separate broom rakes for lawns and shrubs as well as providing other features and advantages heretofore not obtainable.

SUMMARY OF THE INVENTION

It is among the objects of the invention to provide a broom rake suitable for lawns as well as for confined spaces around shrubs and bushes.

Another object of the invention is to provide a broom-type rake that may be selectively converted from a relatively wide lawn rake to a rake of relatively narrow span to accommodate the needs of special conditions.

Still another object of the invention is to provide a means for quickly converting a broom rake from a relatively wide lawn rake to a broom rake of relatively narrow width.

These and other objects are accomplished by the novel broom rake construction of the invention wherein a single broom rake may be selectively used for the different purposes described by means of the unique convertible construction. The rake comprises a handle and three inter-connected rake sections including relatively long flexible prongs. The sections include a center section and two end sections pivotally connected to the center section by hinges or the like. Each end section is pivotable between an open, lawn rake position to form a relatively wide span of adjacent raking prongs, and a folded position over the center section on the rearward side thereof to form a relatively narrow span of adjacent aligned prongs wherein only the center section is operable for raking. A suitable locking arrangement is provided to secure the end sections selectively in each of their two positions.

According to the preferred embodiment, the sections are of approximately equal widths so that the rake in its folded condition has about one-third the width of the rake in its extended condition.

BRIEF DESCRIPTION OF THE DRAWINGS

FIG. 1 is an elevational view of a convertible broom rake embodying the invention with the rake in its extended, wide span condition;

FIG. 2 is a fragmentary elevational view on the same scale as FIG. 1 showing the broom rake in its folded, narrow span condition;

FIG. 5 is a fragmentary sectional view on an enlarged scale taken on the line 5—5 of FIG. 1;

FIG. 6 is a sectional view on an enlarged scale taken on the line 6—6 of FIG. 2;

FIG. 8 is a fragmentary elevational view of an alternate form of convertible broom rake embodying the invention with the rake in its extended, wide span condition;

FIG. 9 is a fragmentary elevational view showing the alternate form of broom rake of FIG. 8 in its folded, narrow span condition;

FIG. 10 is a fragmentary elevational view on an enlarged scale showing a portion of the rake of FIG. 8 and wherein the rake is in its extended, wide span condition;

FIG. 12 is a fragmentary sectional view taken on the line 12—12 of FIG. 10; and

DESCRIPTION OF THE PREFERRED EMBODIMENTS

Figure 3:
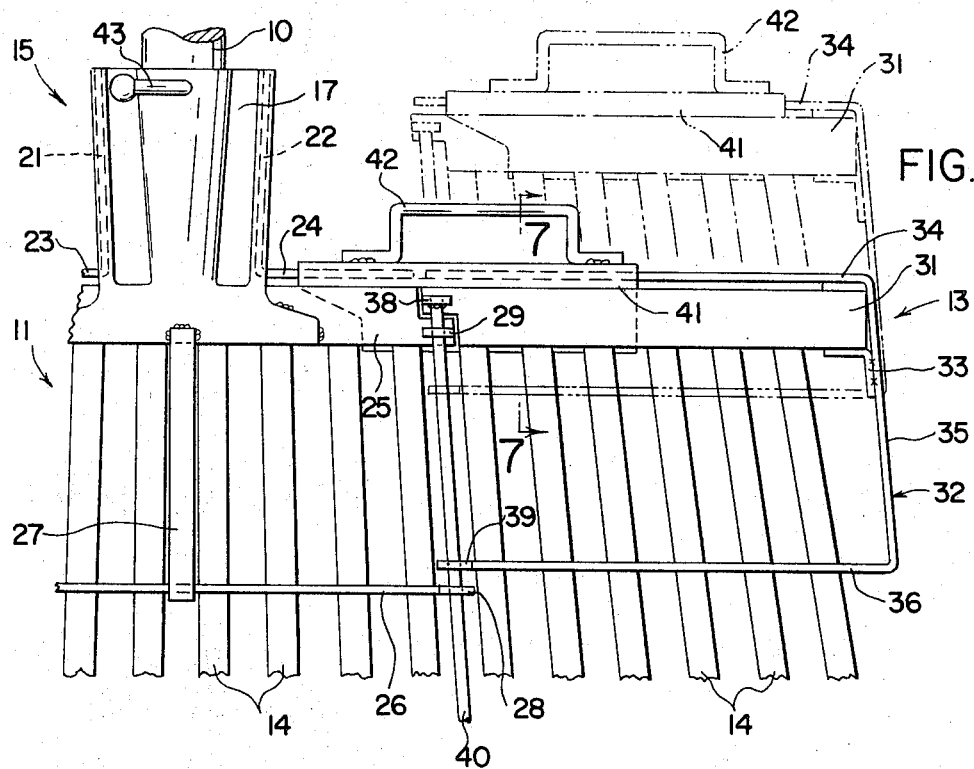
FIG. 3 is a fragmentary elevational view on an enlarged scale illustrating the convertible broom rake of FIG. 1 in its extended, wide span condition.
Figure 4:
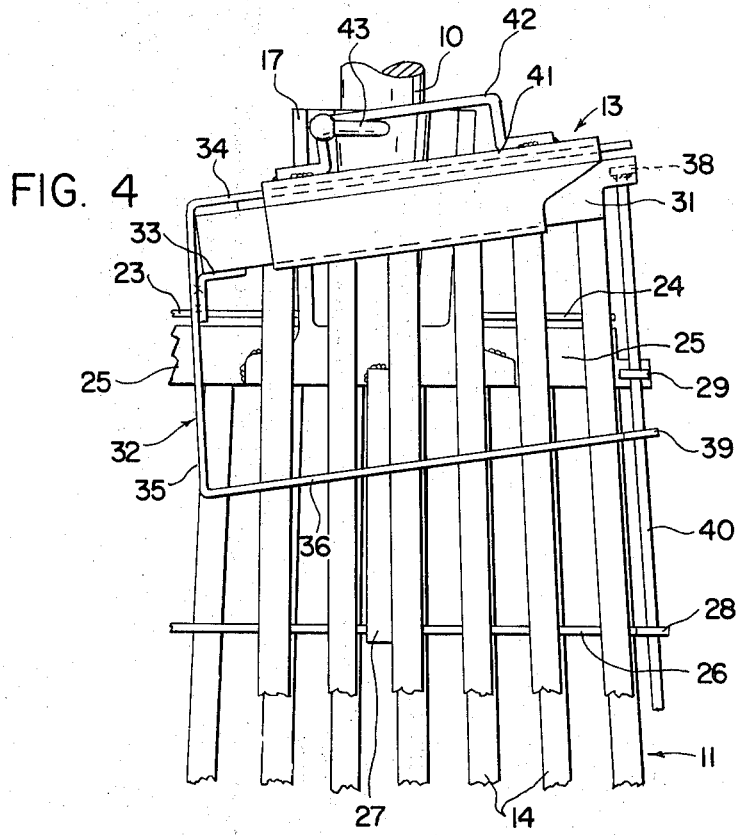
FIG. 4 is a fragmentary elevational view drawn to the same scale as FIG. 3 illustrating the broom rake partially folded to its narrow span condition.
Figure 7:
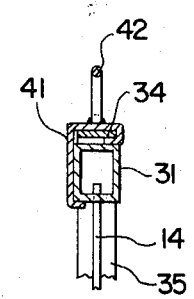
FIG. 7 is a fragmentary sectional view on an enlarged scale taken on the line 7—7 of FIG. 3.
Figure 11:
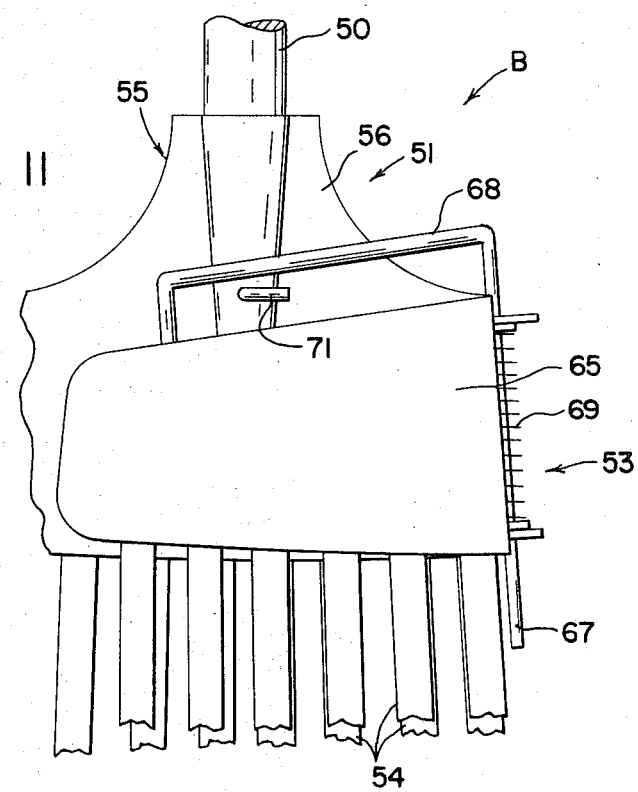
FIG. 11 is a fragmentary elevational view on an enlarged scale illustrating the rake of FIG. 8 in a partially folded condition.
Figure 13:
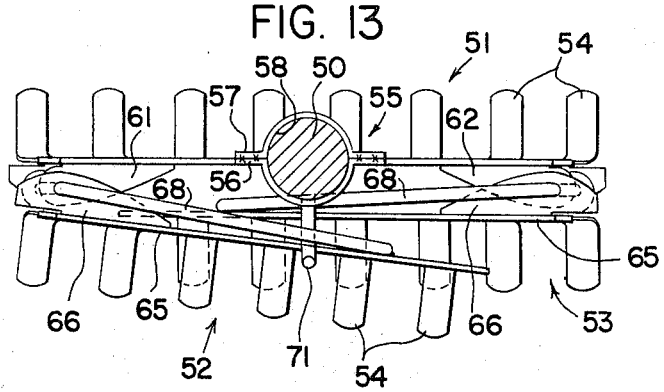
FIG. 13 is a sectional view on an enlarged scale taken on the line 13—13 of FIG. 9.

Referring more particularly to the drawings and initially to FIGS. 1 through 7, there is shown a broom rake A embodying a preferred form of the invention. The broom rake A comprises a handle 10 of conventional form and three raking sections including a center section 11 and two end sections 12 and 13 pivotally connected to opposite sides of the center section 11. The end sections 12 and 13 are pivotal between an open outwardly extending position as illustrated in FIGS. 1, 3 and 5, and a closed folded position as illustrated in FIGS. 2, 4 and 6. In the folded position, the rake A has an effective raking width suitable for use in confined spaces as around bushes and shrubs. The sections all have a plurality of prongs 14 most commonly formed of resilient tempered steel. The center section 11 comprises a tongue 15 formed of two fabricated sheet metal plates 16 and 17 (FIGS. 5 and 6) welded together and adapted to form a socket 18 for the handle 10 as well as two slots 19 and 20 adapted to receive upwardly extending end portions 21 and 22 of a pair of metal bars 23 and 24 that extend outwardly from the tongue 15. The lower portions of the plates 16 and 17 have welded therebetween a tubular cross member 25 that extends perpendicular to the handle 10.

The center section 11 also has a lower cross member 26 which is spaced below and connected to the cross member 25 by means of a vertical strut 27. The opposite ends of the lower cross member 26 each have a hinge bracket 28 (as best seen in FIGS. 3 and 4). The tubular cross member 25 also has at each of its opposite ends a hinge bracket 29 in spaced vertical alignment with the bracket 28 of the respective lower cross member 26.

The ends sections 12 and 13 are essentially identical and will be described only with respect to the section 13, like numbers being applied to corresponding parts. The section 13 includes a tubular cross member 31 corresponding to the cross member 25 of the center section 11. When the rake A is in its extended, wide span condition as illustrated in FIG. 3, the cross member 31 is aligned end-to-end with the cross member 25. A U-shaped frame element 32 is connected to the cross member 31 by an L-shaped bracket 33 welded to the respective parts. The frame element 32 has an upper horizontal leg 34 spaced slightly from the top of the cross member 31 and as viewed in FIG. 3, in general registration and alignment with the bar 24 of the center section 11. The central span 35 of the bracket 33 is generally vertical and extends between the upper leg 34 and a lower horizontal leg 36 which is parallel to the lower cross member 26 of the center section 11.

The tubular cross member 31 has a hinge bracket 38 located slightly above the hinge bracket 29 of the cross member 25 and in general vertical alignment therewith. The lower leg 36 has a hinge bracket 39 located slightly above the bracket 28 and in vertical alignment therewith. A pivot pin 40 connects the brackets 28, 29, 38, 39 to provide for pivotal movement of the end section 13 about the pin axis and relative to the center section 11. The upper portion of the pin 40 is welded to the brackets 38 so that the pin may slide up and down through the brackets 28 and 29 when the end section 13 is raised.

A locking slide 41 cooperates with the bar 24 and the upper leg 34 to lock the end section 13 in its extended, wide span position as best illustrated in FIGS. 1, 3 and 5. The slide is movable between a position illustrated in dashed lines in FIG. 3 wherein it is disengaged from the center section 11 to permit the end section 13 to be folded over as illustrated in FIG. 4. When the end section 13 is pivoted outwardly (FIG. 3), the locking slide 41 may be slid to the left over the tubular cross member 25 and bar 24 of the center section to lock the two sections 11 and 13 in the outwardly extended position.

The locking slide 41 has a handle 42 welded thereon to facilitate both lifting of the end section 13 and folding thereof to the closed position. The closed, folded position of both end sections 12 and 13 is illustrated in FIGS. 2 and 6 wherein the sections are locked in position by means of a locking pin 43. In this position the broom rake A has an effective width limited to that of the center section 11 to facilitate use in confined spaces such as around shrubs and bushes.

FIGS. 8 through 13 illustrate an alternate form of the invention comprising a broom rake B of modified construction as compared to the broom rake A. The broom rake B comprises a handle 50 of conventional style, a center section 51 and two end sections 52 and 53. The sections have a plurality of prongs 54 of the same general construction as the prongs of the broom rake A described above.

The center section 51 has a tongue 55 conprising a main plate 56 and a cooperating socket plate 57 so that the plates 56 and 57 define a socket 58 for the end of the handle 50. The main plate has a pair of U-shaped hinge brackets 61 and 62 welded thereto at opposite sides.

The end sections 52 and 53 are identical and will be described with reference only to the end section 53, like numerals being used to identify corresponding parts in the section 52. The end section 53 has a plate 65 extending outwardly from the main plate 56 as best shown in FIGS. 8 and 10. A hinge bracket 66 is welded to the inner end of the plate 65 with extending portions in registration and alignment with the respective parts of the hinge bracket 62. A hinge pin 67 connects the brackets in pivotal relation to one another to prevent movement between the open extended position illustrated in FIGS. 8, 10 and 12 to the closed folded position illustrated in FIGS. 9, 11 and 13. In the open extended position a locking element 70 on the upper portion of the bracket 66 bears against the main plate 56 to lock the section 53 positively in position.

The upper portion of the hinge pin 67 is bent to form a handle 68, the outer end thereof being welded to the plate 65. A helical spring 69 is interposed between the lower part of the bracket 66 and the upper part of the bracket 61 to resist upward movement of the end section 53 relative to the center section 51. When the end section 53 is lifted using the handle 68, the locking element 70 is raised out of locking relation to the main plate 56 of the center section 51 and the section 53 may be pivoted or folded inward to the position illustrated in FIGS. 9, 11 and 13. With both the end sections 52 and 53 folded in, the locking pin 71 secured in the socket 58 and handle 50 may be pivoted to secure the sections 52 and 53 in the folded position. In this position a rake of narrower width is provided for use in confined spaces such as around shrubs and bushes.

If desired, the brackets may be spring biased to the outwardly extended position such as by means of a coil spring or the like to facilitate movement of the sections from the folded sections 52 and 53 from their folded position to their open full span end position.

While the invention has been shown and described with respect to preferred embodiments thereof, other modifications and variations will be apparent to those skilled in the art all within the intended spirit and scope of the invention. Accordingly, the patent is not to be limited to the specific forms herein shown and described nor in any other way that is inconsistent with the extent to which the progress in the art has been advanced by the invention.

I claim:

1. A lawn and garden broom rake adapted for selective use as both a lawn rake and a shrub rake comprising:
   a handle,
   three rake sections with prongs including a center section connected to and generally parallel to said handle, and two end sections pivotally connected to said center section whereby each end section is pivotable about an axis generally aligned with said handle, between an open, lawn rake position to form a relatively wide span of adjacent raking prongs, and a folded position overlying one another and overlying said center section on the rearward side thereof whereby only the center section is operable for raking, and means operatively associated with said center section for securing said end sections in each of said positions.

2. A broom rake as defined in claim 1 wherein said end sections are pivotally connected by to said center section hinge pins.

3. A broom rake as defined in claim 1 including a pair of locking slides, one for each end section and cooperating members on said center section and end sections on which said locking slides are movable between a position located entirely on the cooperating member of their respective end section to permit said end section to be folded, and a locking position wherein each locking slide receives both a portion of the cooperating member of said center section and an aligned portion of the cooperating member of its respective end section to lock the respective end sections in their open extended position.

4. A broom rake as defined in claim 1 wherein said end sections are pivotally connected to said center section by hinge pins and including means on said end sections operatively associated with said hinge pins for sliding said end section along the axis of said hinge pins whereby said end sections may be retained in a raised condition when pivoted to their folded position.

5. A broom rake as defined in claim 4 including spring means urging said end sections to their lowered positions.

6. A broom rake as defined in claim 5 wherein said means for locking said end sections in their open, extended position comprises a locking element affixed to each end section and adapted to bear against said center section and prevent folding of said respective end section from its open extended position when said respective end section is in its lowered position, said locking element being adapted to release said respective end section when said end section is lifted to its raised position.

* * * * *